United States Patent
Itsuaki et al.

(10) Patent No.: US 8,261,889 B2
(45) Date of Patent: Sep. 11, 2012

(54) OPPOSED-PISTON DISC BRAKE

(75) Inventors: Satoru Itsuaki, Ikeda (JP); Shinichi Morita, Nagoya (JP)

(73) Assignee: Advics Co., Ltd., Kariya-City, Aichi-Pref (JP)

( * ) Notice: Subject to any disclaimer, the term of this patent is extended or adjusted under 35 U.S.C. 154(b) by 394 days.

(21) Appl. No.: 12/578,121

(22) Filed: Oct. 13, 2009

(65) Prior Publication Data

US 2010/0096223 A1    Apr. 22, 2010

(30) Foreign Application Priority Data

Oct. 21, 2008    (JP) .................. 2008-270907

(51) Int. Cl.
*F16D 55/18* (2006.01)
*F16D 55/228* (2006.01)
(52) U.S. Cl. ....... 188/72.4; 188/72.1; 188/352; 188/370
(58) Field of Classification Search .................. 188/71.1, 188/72.1, 72.4, 73.1, 352, 370
See application file for complete search history.

(56) References Cited

U.S. PATENT DOCUMENTS

| 3,183,999 | A | * | 5/1965 | Buyze et al. | 188/370 |
| 4,754,856 | A | * | 7/1988 | Villata | 188/370 |
| 6,367,595 | B1 | * | 4/2002 | Mori et al. | 188/73.1 |
| 6,986,410 | B2 | * | 1/2006 | Simmons et al. | 188/72.4 |
| 7,597,178 | B2 | * | 10/2009 | Dennis et al. | 188/72.4 |

FOREIGN PATENT DOCUMENTS

JP    11-117964 A    4/1999
JP    2005-163809 A    6/2005

* cited by examiner

*Primary Examiner* — Thomas J Williams
(74) *Attorney, Agent, or Firm* — Buchanan Ingersoll & Rooney PC

(57) ABSTRACT

An opposed-piston disc brake includes cylinder connection oil passages respectively connected to a cylinder of an inner caliper portion and a cylinder of an outer caliper portion, passage communication bores respectively formed at bridge portions to extend in an axial direction of a disc in a substantially straight manner. The cylinder connection oil passages are formed using a core at the time when a caliper body is cast. The cylinder connection oil passages extend in a radially outer direction of the disc. Ends of the cylinder connection oil passages in a longitudinal direction thereof are directly connected to the passage communication bores. In a state where the caliper body is mounted on a vehicle, a top portion of an inner wall surface of one of the passage communication bores is positioned higher than the ends of the cylinder connection oil passages.

12 Claims, 4 Drawing Sheets

OPPOSED-PISTON DISC BRAKE

CROSS REFERENCE TO RELATED APPLICATIONS

This application is based on and claims priority under 35 U.S.C. §119 to Japanese Patent Application 2008-270907, filed on Oct. 21, 2008, the entire contents of which is incorporated herein by reference.

FIELD OF THE INVENTION

The present invention relates to an opposed-piston disc brake.

BACKGROUND

According to an opposed-piston disc brake disclosed in JP11-117964A and JP2005-163809A, cylinders formed at an inner caliper are connected to cylinders formed at an outer caliper via an oil passage formed at an inside of a caliper body. In a known configuration, the oil passage of the caliper body is formed using a core.

According to the disc brake (a brake caliper) disclosed in JP11-117964A, the inner and outer calipers, into which the caliper body is splittable, include straight passages and introduction ports, each of which is formed using the core when the caliper body is cast. The straight passages extend in an axial direction of a disc (a disc rotor). The introduction ports extend from bottom portions of the cylinders toward a radially outer direction of the disc (the disc rotor) to connect to the straight passages. The straight passages are formed at a bridge portion, whose axial length (a width) is splittable in a radial direction of the disc. A bridge portion of the inner caliper and a bridge portion of the outer caliper are brought to face each other and then connected to each other by means of bolts so that the straight passages of the inner and outer calipers are connected to each other, in order to establish communication between the cylinders of the inner and outer calipers.

According to the disc brake disclosed in JP2005-163809A, tapered-triangular shaped recessed portions, which extend in the radially outer direction of the disc, are respectively formed at bottom portions of the cylinders using the core. The recessed portions are connected to a connection bore, a communication bore and a passage bore, each of which is mechanically processed. Consequently, the cylinders of the inner caliper are connected to the cylinders of the outer caliper.

A method for forming the straight passages at the bridge portion of the caliper body using the core and a method for forming the same using a drill are disclosed in JP11-117964A. However, the straight passages are too narrow and too long to be formed using the core. Specifically in a case where the inner and outer calipers are integrally formed, as disclosed in JP2005-163809A, a length of the straight passages is further elongated. Therefore, it may be extremely difficult to form the straight passages using the core. Accordingly, the straight passages are processed by means of the drill.

However, the straight passages (referred to as a communication bore hereinafter), which are a narrow long hole, may easily buckle (bend) while the communication bore is processed by means of the drill. Due to the buckling, a connecting point where the communication bore is connected to a connecting mate (the introduction port according to JP11-117964A), may be displaced. In the configuration of JP11-117964A, a tolerance range relative to the displacement of the connecting point is narrow. Therefore, a defective connection, caused by the displacement of the connecting point, may occur, that may cause a defection.

For example, depending on a level of the buckling (bending) of the communication bore while being processed by means of the drill, in a state where the caliper body is mounted on a vehicle, the communication bore may be positioned lower than an end of the connecting mate. Consequently, the end of the connecting mate may protrude higher than the contacting point where the communication bore and the contacting mate contact. As a result, an air pocket may be generated at the end of the connecting mate. Accordingly, air may not be removed completely. Further, the communication bore and the connecting mate may not surely communicate.

The aforementioned drawback may be more likely to occur in an integral caliper body, disclosed in, for example, JP2005-163809A because the communication bore, processed by means of the drill, is longer, and therefore the communication bore may more easily buckle.

On the other hand, according to JP2005-163809A, the recessed portion, formed at the inner caliper, and the recessed portion, formed at the outer caliper, are connected to each other via a plurality of bores. Because the oil passage is divided into the plurality of bores, a length of each of the bores is shortened. Therefore, compared to the disc brake according to JP11-117964A, the communication bore is less likely to buckle, and consequently, a defective connection due to the buckling of the communication bore is less likely to occur. However, man-hours necessary to produce the bores increases. Further, the plurality of bores is processed from different directions. Therefore, facilities being capable of producing the plurality of bores from different directions are required, that may results in a more expensive facility cost.

A need thus exists for an opposed-piston disc brake, which is not susceptible to the drawback mentioned above.

SUMMARY OF THE INVENTION

According to an aspect of the present invention, an opposed-piston disc brake includes a caliper body including an inner caliper portion and an outer caliper portion facing the inner caliper portion, the inner caliper potion and the outer caliper portion being connected to each other via bridge portions extending over a disc rotor, pistons inserted into corresponding cylinders provided at the inner caliper portion and the outer caliper portion, the pistons being hydraulically operated, brake pads arranged to face each other and being thrust by the pistons to slidably contact the disc rotor, cylinder connection oil passages respectively connected to the cylinder of the inner caliper portion and the cylinder of the outer caliper portion, passage communication bores respectively formed at the bridge portions to extend in an axial direction of a disc in a substantially straight manner, and an air bleeder screwed into a bleeder hole to fill the bleeder hole, the bleeder hole formed to be connected to an inner end portion of one of passage communication bores. The cylinder connection oil passages are formed using a core at the time when the caliper body is cast, the cylinder connection oil passages extend from bottom portions of the cylinders to the passage communication bores in a radially outer direction of the disc. Ends of the cylinder connection oil passages in a longitudinal direction thereof are directly connected to the passage communication bores. In a state where the caliper body is mounted on a vehicle, a top portion of an inner wall surface of one of the passage communication bores, formed at the bridge portion formed at an upper side of the caliper body, is positioned higher than the ends of the cylinder connection oil passages.

"The passage communication bores extending in the axial direction of the disc", mentioned herein, refer to a bore, extending in parallel with an axis of the disc, as well as a bore, extending so as to incline relative to the axis of the disc. Further, "upper" mentioned herein indicates a higher side relative to a horizon.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

First Embodiment

Figure 1:
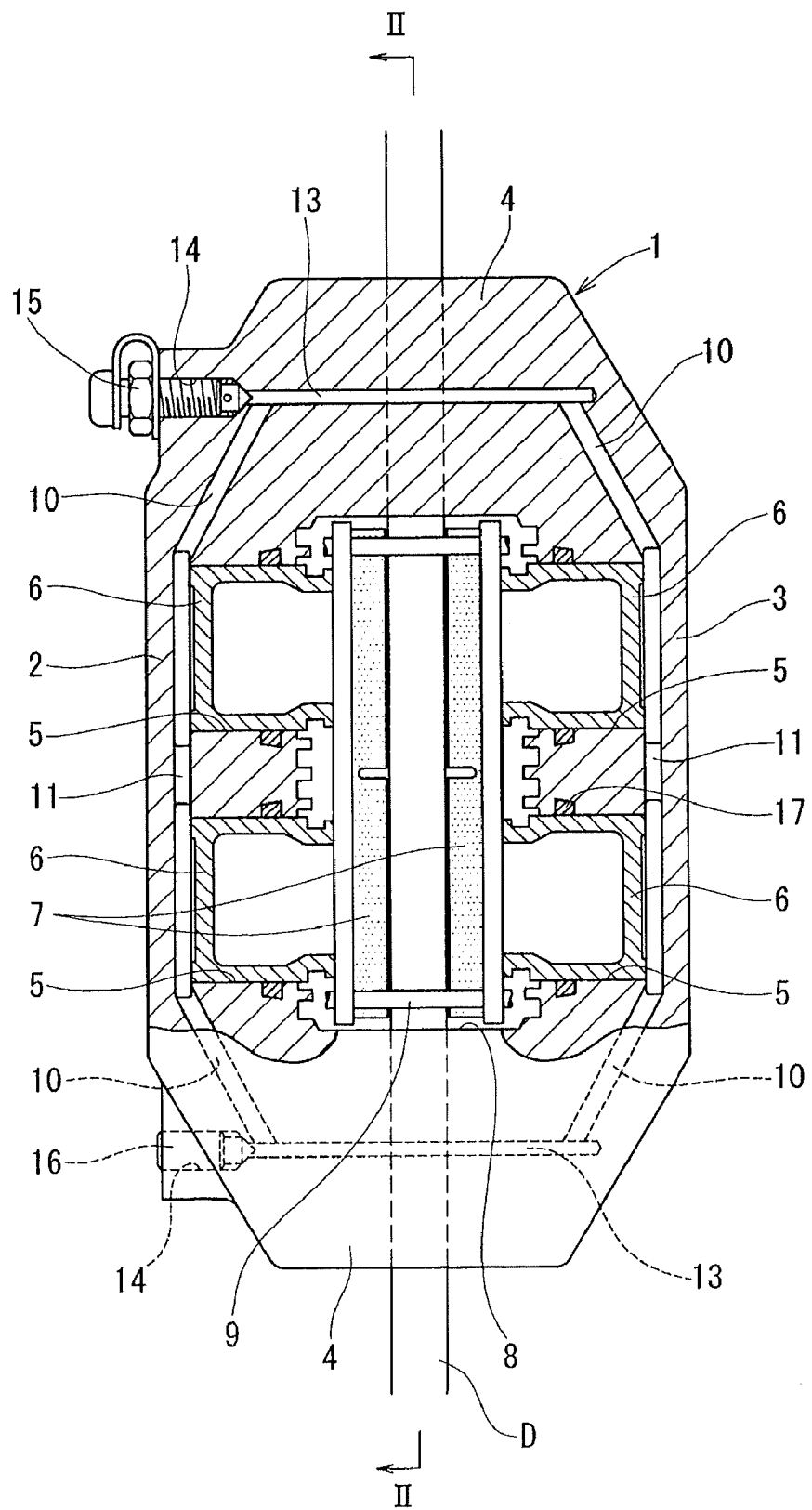
FIG. 1 is a partially cutaway front view illustrating an opposed-piston disc brake according to a first embodiment.
Figure 2:
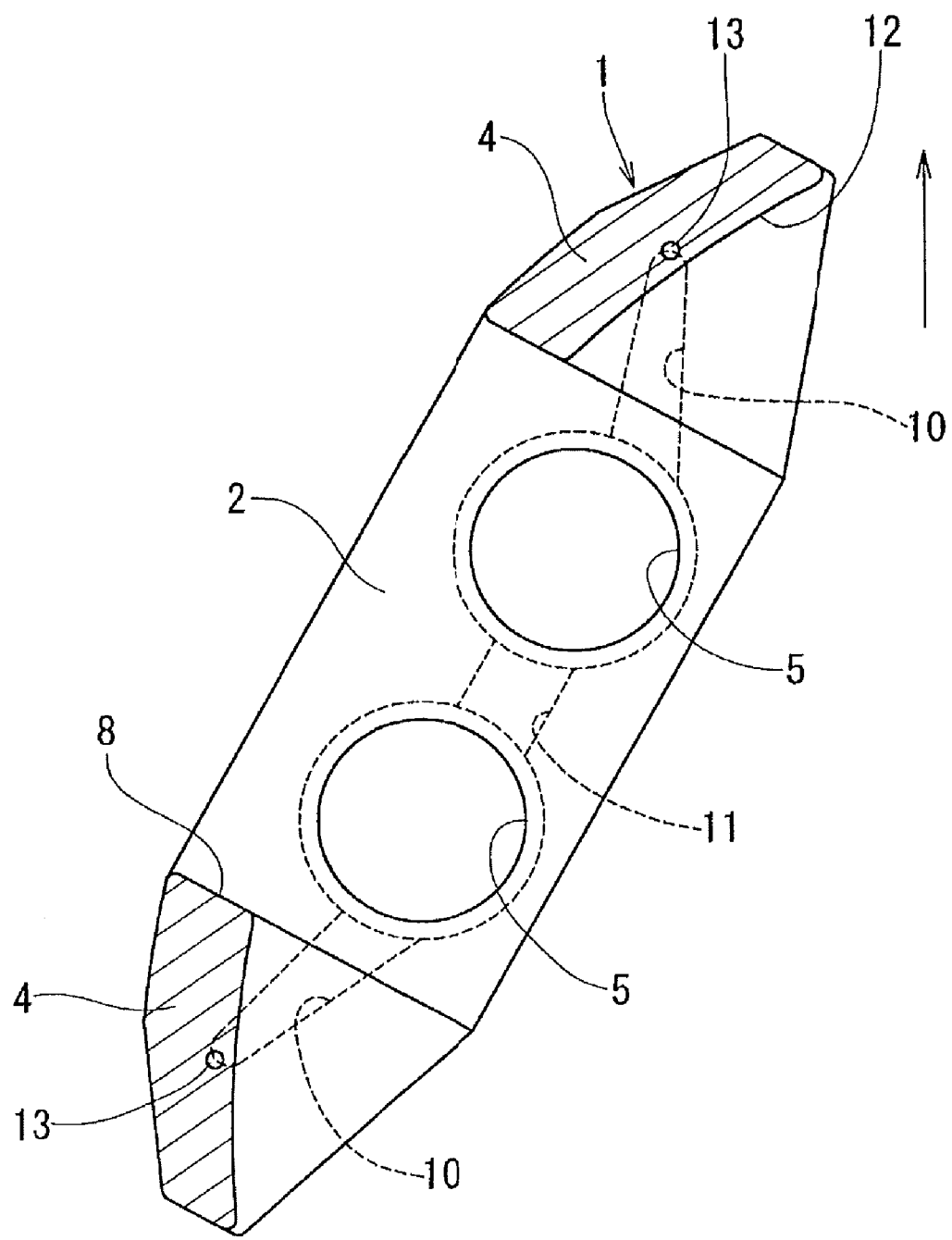
FIG. 2 is cross-sectional view illustrating a caliper body taken along line II-II in FIG. 1.

A first embodiment of an opposed-piston disc brake will be described hereinafter with reference to the attached FIGS. 1 to 4. FIGS. 1 and 2 illustrate the first embodiment. Directions, such as "higher", "lower", "inner" and "outer" used hereinafter correspond to an orientation of the opposed-piston disc brake. The opposed-piston disc brake includes a caliper body 1, pistons 6, which are hydraulically operated, and brake pads 7, which are arranged to face each other and thrust by the pistons 6 so as to slidably contact a disc rotor D.

The caliper body 1 includes an inner caliper portion 2 and an outer caliper portion 3, which faces the inner caliper portion 2, and upper and lower bridge portions 4, each of which extends over the disc rotor D. "An upper bridge portion 4" and "a lower bridge portion 4" referred to hereinafter correspond to the bridge portions 4 that are formed at an upper and lower side of the caliper body 1, respectively, in a state where the caliper body 1 is mounted on the vehicle. The inner and outer calipers 2 and 3 are connected to each other via the bridge portions 4. According to the caliper body 1 of the disc brake in the first embodiment, the inner caliper portion 2, the outer caliper portion 3 and the bridge portions 4 are cast so as to be integrally formed (integrally formed by a casting process).

Cylinders 5 are formed at the inner caliper portion 2 and the outer caliper portion 3, which are arranged on a left side and a right side in FIG. 1, respectively. The pistons 6 are fluid-tightly inserted into the corresponding cylinders 5. Piston seals 17 seal outer circumferential surfaces of the corresponding pistons 6. Further, the piston seals 17 retract the pistons 6 for a predetermined amount when a pressure is reduced.

An opening portion 8 is formed at the caliper body 1. The brake pads 7, which are thrust by the pistons 6 so as to slidably contact the disc rotor D, are arranged within the opening portion 8 so as to be movable in an axial direction of a disc. The brake pads 7 are held by the caliper body 1 by means of pad pins 9, which are fixed to the caliper body 1.

Characteristic configurations of the first embodiment will be described hereinafter. Inner and outer cylinder connection oil passages 10 are respectively formed at the inner and outer calipers 2 and 3 to extend from bottom portions (ends opposite from the brake pads 7) of the corresponding cylinders 5 toward a radially outer direction of the disc. The cylinder connection oil passages 10 are formed integrally with the cylinders 5 and communication passages 11, which allow communication between the adjacent cylinders 5, using a collapsible core, at the time when the caliper body 1 is cast. Upper and lower ends of the cylinder connection oil passages 10 in a longitudinal direction thereof are located outer than a disc groove 12 (see FIG. 2), which is formed at the caliper body 1, in the radial direction of the disc (i.e., at areas extended from the bridge portions 4 in the axial direction of the disc).

Further, upper and lower passage communication bores 13 are respectively formed at the bridge portions 4 of the caliper body 1 to extend in the axial direction of the disc. A bleeder hole 14 is formed to be connected to an inner end portion (left side in FIG. 1) of the upper passage communication bore 13 coaxially. An air bleeder 15 is screwed into the bleeder hole 14 to fill the bleeder hole 14. The upper passage communication bore 13, which is formed by means of a drill, serves as a prepared hole for processing the bleeder holes 14.

The passage communication bores 13 are processed from an inner side (left side in FIG. 1) of the caliper body 1, by means of the drill. The passage communication bores 13 extend in a straight manner and have a small radius. The cylinder connection oil passages 10 extend from the bottom portion of the cylinders 5 in the radially outer direction of the disc to a point where the passage communication bores 13 are formed. The upper passage communication bore 13, which is formed at the inner and outer calipers 2 and 3, is directly connected to the upper end of the inner cylinder connection oil passage 10 and to the upper end of the outer cylinder connection oil passage 10. Likewise, the lower passage communication bore 13, which is formed at the inner and outer calipers 2 and 3, is directly connected to the lower end of the inner cylinder connection oil passage 10 and the lower end of the outer cylinder connection oil passage 10. A connecting portion where the upper passage communication bore 13 is connected to the upper end of one of the cylinder connection oil passages 10 will be mainly described hereinafter, as an example.

The passage communication bore 13 is formed into an circular shape when seen in a cross-sectional view taken along a line orthogonal to the axial direction of the disc. On the other hand, as illustrated by a solid line in FIG. 4B, the end of the cylinder connection oil passage 10 is formed into a semi-circular shape whose radius is larger than a radius of the passage communication bore 13 when seen in a cross-sectional view taken along a line orthogonal to the axial direction of the disc. The end of the cylinder connection oil passage 10 is connected to the passage communication bore 13, so that when seen in the cross-sectional view, a center of the passage communication bore 13 is eccentrically positioned relative to a center of the end of the cylinder connection oil passage 10.

In a state where the caliper body 1 is mounted on a vehicle, the passage communication bore 13, which is formed at the upper bridge portion 4 is connected to the cylinder connection oil passage 10 so that a top portion T of an inner wall surface of the passage communication bore 13 is positioned higher than the end of the cylinder connection oil passage 10.

A distance between the end of the cylinder connection oil passage 10 and the top portion T of the inner wall surface of the passage communication bore 13 is designed to be larger than an estimated amount of buckling, which may occur when the passage communication bore 13 is formed by means of the drill. Accordingly, in a state where the caliper body 1 is mounted on the vehicle, the top portion T of the inner wall surface of the passage communication bore 13 is surely positioned higher than the position of the end of the cylinder connection oil passage 10.

As described above, the radius of the end of the cylinder connection oil passage 10 is set to be larger than the radius of the passage communication bore 13. Further, in a state where the caliper body 1 is mounted on the vehicle, the top portion T of the inner wall surface of the passage communication bore 13 is arranged higher than the end of the cylinder connection oil passage 10. Effects obtainable in such configuration will be described hereinafter.

Figure 4A:
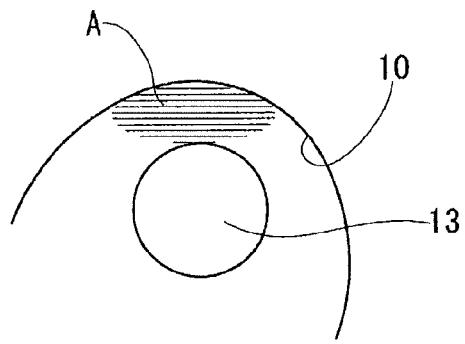
FIG. 4A is a diagram illustrating a positional relationship between an end of a cylinder connection oil passage and a passage communication hole according to a comparative example.

FIG. 4A illustrates a state where the end of the cylinder connection oil passage 10 is positioned higher than the top portion T of the inner wall surface of the passage communication bore 13. In such state, an air pocket A is generated at a portion of the end of the cylinder connection oil passage 10 higher than the passage communication bore 13. As a result, air is not completely removed from brake hydraulic oil.

Figure 4B:
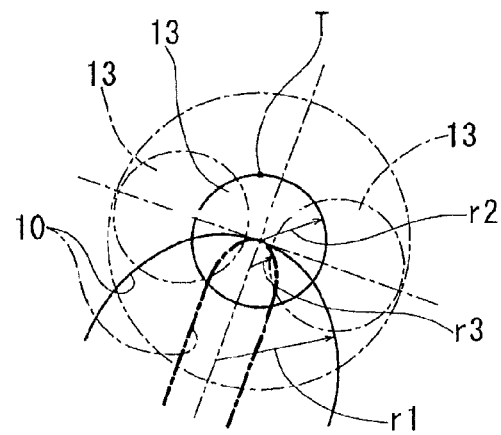
FIG. 4B is a diagram illustrating a relationship between a radius of the end of the cylinder connection oil passage and a radius of the passage communication hole, comparing the first embodiment and the comparative example.

FIG. 4B illustrates a difference in effects between the first embodiment and a comparative example, where the radius of the end of the cylinder connection oil passage 10 is larger or smaller than the radius of the upper passage communication bore 13. As illustrated by a solid line in FIG. 4B, according to the first embodiment, a radius r1 of the end of the cylinder connection oil passage 10 is larger than a radius r2 of the passage communication bore 13. In such a case, the end of the cylinder connection oil passage 10 and the passage communication bore 13 are suitably connected to each other, even though the passage communication bore 13 may be displaced from a target position illustrated by the solid line in FIG. 4B. On the other hand, as illustrated by a bold dashed line in FIG. 4B, according to the comparative example, a radius r3 of the end of the cylinder connection oil passages 10 is smaller than the radius r2 of the passage communication bore 13. In such a case, when the passage communication bore 13 may be displaced from the target position, the end of the cylinder connection oil passage 10 and the passage communication bore 13 may not be suitably connected to each other. As a result, a dimension where the end of the cylinder connection oil passage 10 and the passage communication bore 13 are connected to each other, may not be securely obtained.

Figure 4C:
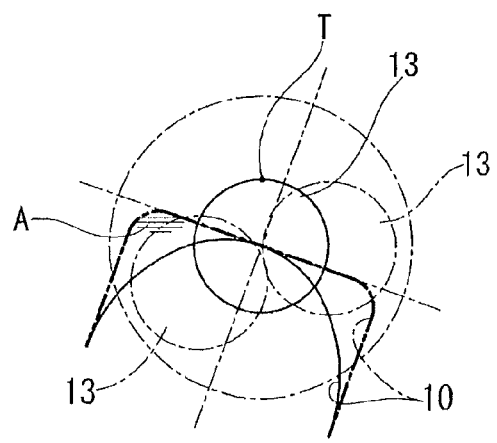
FIG. 4C is a diagram illustrating a shape of the end of the cylinder connection oil passage, comparing the first embodiment and the comparative example.

FIG. 4C illustrates a difference in effects between the first embodiment and a comparative example where the end of the cylinder connection oil passage 10 is formed into a substantially square shape or a substantially circular shape. As illustrated by a dashed line in FIG. 4C, according to the comparative example, the end of the cylinder connection oil passage 10 is formed in to the substantially square shape. In such a case, displacement of the passage communication bore 13 from the target position may be allowable. However, when an axis of the cylinder connection oil passages 10 inclines relative to a vertical axis in the cross-sectional view ("a vertical axis" herein refers to an imaginary axis extending vertically in FIG. 4C), one of corners of the square-shaped end of the cylinder connection oil passage 10 is positioned higher than the connecting portion where the end of the cylinder connection oil passage 10 and the passage communication bore 13 are connected to each other. As a result, the air pocket A may be generated. On the other hand, according to the first embodiment, the end of the cylinder connection oil passage 10 is formed into a substantially circular shape, as illustrated by a solid line in FIG. 4C. In such a case, even when the passage communication bore 13 is displaced from the target position illustrated in the solid line in FIG. 4C, the end of the cylinder connection oil passage 10 and the passage communication bore 13 are suitably connected to each other. As a result, the air pocket A may not be generated.

For the aforementioned reasons, the end of the cylinder connection oil passage 10 is formed into a semi-circular shape having the larger radius than the radius of the passage communication bore 13, when seen in the cross-sectional view. Further, in a state where the caliper body 1 is mounted on the vehicle, the top portion T of the inner wall surface of the passage communication bore 13 is positioned higher than the end of the cylinder connection oil passage 10.

Second Embodiment

Figure 3:
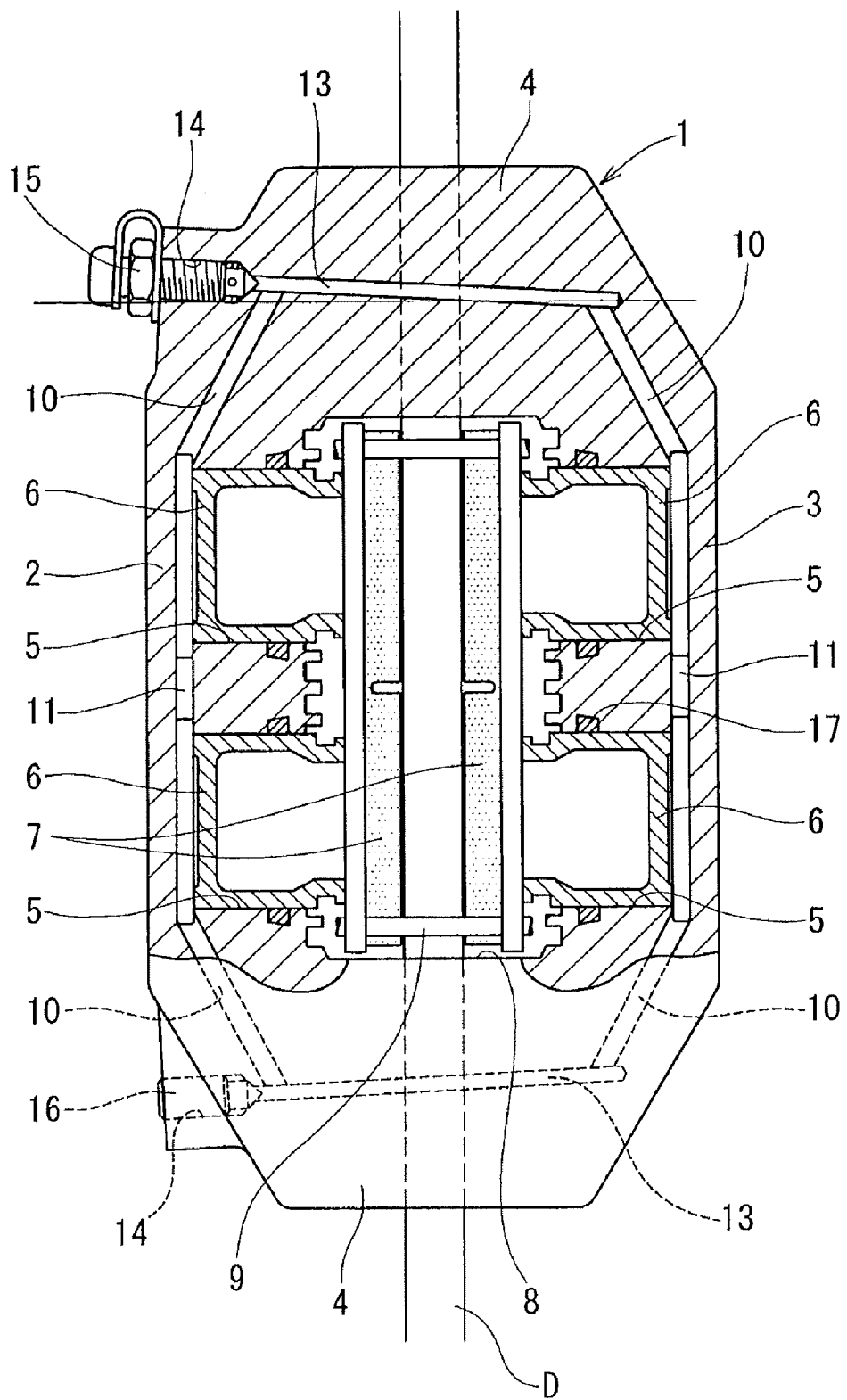
FIG. 3 is a partially cutaway front view illustrating an opposed-piston disc brake according to a second embodiment.

FIG. 3 illustrates a second embodiment of the opposed-piston disc brake. In the disc brake according to the second embodiment, the inner cylinder connection oil passage 10 (provided on a left side in FIG. 3), which is connected to the cylinders 5 of the inner caliper portion 2, extends radially more outwardly than the outer cylinder connection oil passage 10 (provided on a right side in FIG. 3), which is connected to the cylinders 5 of the outer caliper portion 3. In other words, in a state where the caliper body 1 is mounted on the vehicle, the passage communication bore 13, which is formed at the upper bridge portion 4, inclines relative to the axis of the disc so that the inner side (the left side in FIG. 3) of the passage communication bore 13 is higher than the outer side (a right side in FIG. 3) thereof.

According to the aforementioned configuration, air, which may exist within the oil passage filled with the brake hydraulic oil, may naturally flow into the bleeder hole 14. As a result, the air may be removed easily.

As illustrated in FIGS. 1 and 3, a stopper 16 is provided to fill in an opening end of the passage communication bore 13, which is formed at the lower bridge portion 4 in a state where the caliper body 1 is mounted on the vehicle. Generally, a brake caliper is formed symmetrical on an input side of a disc rotor and an output side of the disc rotor, in order to mount the brake caliper either on a left side or a right side of the vehicle. The disc brake according to the first and second embodiments is also formed symmetrically. Therefore, the disc brake may be mounted either on the left side or the right side of the vehicle by switching positions of the air bleeder 15 and the stopper 16.

The disc brake according to the first and second embodiments includes a plurality of pistons 6, arranged in a rotational direction of the disc rotor D. However, the embodiments may be applied in a disc brake, which includes only one piston at an inner side and one piston at an output side.

According to the opposed-piston disc brake, the oil passage, through which the cylinders 5 of the inner and outer calipers 2 and 3 communicate, is easily processed, and air is completely removed from the brake hydraulic oil.

Further, the cylinder connection oil passages 10, which extend in the radially outer direction of the disc are respectively formed at the inner caliper portion 2 and the outer caliper portion 3 using the core. The cylinder connection oil passages 10 of the inner and outer calipers 2 and 3 are connected to each other through the passage communication bores 13, which are respectively formed at the bridge portions 4 to extend in a straight manner. Therefore, a pair of the cylinder connection oil passages 10 may communicate with each other through only one of the communication bores 13. Accordingly, the man-hours required to process the oil passage are reduced.

Furthermore, even when the communication bore 13 buckles while being processed by means of the drill, the ends of the cylinder connection oil passage 10 are not positioned higher than the top portion T of the inner wall portion of the passage communication bore 13. Accordingly, the air pocket A may not be generated at the inside of the oil passage, and air may be surely removed when the brake hydraulic oil is filled.

According to the second embodiment, in a state where the caliper body 1 is mounted on the vehicle, the cylinder connection oil passages 10 are directly connected to one of the passage communication bores 13, formed at the bridge portion 4 formed at the upper side of the caliper body 1, one of the cylinder connection oil passages 13, connected to the cylinder 5 of the inner caliper portion 2, extends in the radially more outer direction of the disc than the other cylinder connection oil passage 10, connected to the cylinder 5 of the outer caliper portion 3. One of the passage communication bores 13, formed at the bridge portion 4 formed at the upper side of the caliper body 1, is formed so as to incline relative to the axial direction of the disc, so that an inner side of the passage communication bore 13 is positioned higher than the outer side thereof.

Accordingly, air, which may exist in the oil passage filled with the brake hydraulic oil, flows toward the inner side of the passage communication bore 13. Therefore, air is more surely removed.

According to the first and second embodiments, each of the passage communication bores 13 is formed so as to have a circular-shaped cross section and a radius of the ends of each of the cylinder connection oil passages 10 is set to be larger than a radius of each of the passage communication bores 10, when seen in a cross-sectional view taken along a line orthogonal relative to the axial direction of the disc.

Accordingly, a dimension of the ends of each of the cylinder connection oil passages 10 increases. Therefore, a tolerance range relative to the buckling of the passage communication bores 13 is increased. As a result, the passage communication bores 13 and the cylinder connection oil passages 10 are surely connected.

According to the first and second embodiments, the bleeder hole 14 is arranged coaxially with one of the passage communication bore 13.

Accordingly, a portion of the upper passage communication bore 13 serves as a prepared hole for the bleeder hole 14. Therefore, man-hours required to process the prepared hole are reduced. Furthermore, such configuration may be applied to the disc brake, in which the inner side of the upper passage communication bore 13 is positioned higher than the outer side thereof. Accordingly, the bleeder hole 14 is positioned at the uppermost position of the oil passage. As a result, air may be more easily removed.

According to the first and second embodiments, the inner caliper portion 2, the outer caliper portion 3 and the bridge portions 4 are integrally cast.

Generally, a length of passage communication bores formed at a caliper body, in which an inner caliper portion, an outer caliper portion and bridge portions are integrally cast, is longer than a length of passage communication bores formed at a caliper body, which is splittable in half. Accordingly, an amount of buckling of the passage communication bores formed at the integrally-formed caliper body may be large. Accordingly, effects of the first and second embodiments may be obtainable more significantly in a disc brake having an integrally-formed caliper body.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An opposed-piston disc brake comprising:
a caliper body including an inner caliper portion and an outer caliper portion facing the inner caliper portion, the inner caliper portion and the outer caliper portion being connected to each other via bridge portions extending over a disc rotor;
pistons inserted into corresponding cylinders provided at the inner caliper portion and the outer caliper portion, the pistons being hydraulically operated;
brake pads arranged to face each other and being thrust by the pistons to slidably contact the disc rotor;
cylinder connection oil passages respectively connected to the cylinder of the inner caliper portion and the cylinder of the outer caliper portion;
passage communication bores respectively formed at the bridge portions to extend in an axial direction of a disc in a substantially straight manner; and
an air bleeder screwed into a bleeder hole to fill the bleeder hole, the bleeder hole formed to be connected to an inner end portion of one of passage communication bores, wherein
the cylinder connection oil passages are formed using a core at the time when the caliper body is cast,
the cylinder connection oil passages extend from bottom portions of the cylinders to the passage communication bores in a radially outer direction of the disc,
ends of the cylinder connection oil passages in a longitudinal direction thereof are directly connected to the passage communication bores,
in a state where the caliper body is mounted on a vehicle, a top portion of an inner wall surface of one of the passage communication bores, formed at the bridge portion formed at an upper side of the caliper body, is positioned higher than the ends of the cylinder connection oil passages,
in a state where the caliper body is mounted on the vehicle, the cylinder connection oil passages are directly connected to one of the passage communication bores, formed at the bridge portion formed at the upper side of the caliper body,
one of the cylinder connection oil passages, connected to the cylinder of the inner caliper portion, extends in the radially more outer direction of the disc than the other cylinder connection oil passage, connected to the cylinder of the outer caliper portion, and wherein
one of the passage communication bores, formed at the bridge portion formed at the upper side of the caliper body, is formed so as to incline relative to the axial direction of the disc, so that an inner side of the passage communication bore is positioned higher than the outer side thereof.

2. The opposed-piston disc brake according to claim 1, wherein each of the passage communication bores is formed so as to have a circular-shaped cross section and a radius of the ends of each of the cylinder connection oil passages is set to be larger than a radius of each of the passage communication bores, when seen in a cross-sectional view taken along a line orthogonal relative to the axial direction of the disc.

3. The opposed-piston disc brake according to claim 2, wherein the bleeder hole is arranged coaxially with one of the passage communication bore.

4. The opposed-piston disc brake according to claim 2, wherein the inner caliper portion, the outer caliper portion and the bridge portions are integrally cast.

5. The opposed-piston disc brake according to claim 3, wherein the inner caliper portion, the outer caliper portion and the bridge portions are integrally cast.

6. The opposed-piston disc brake according to claim 1, wherein the bleeder hole is arranged coaxially with one of the passage communication bore.

7. The opposed-piston disc brake according to claim 6, wherein the inner caliper portion, the outer caliper portion and the bridge portions are integrally cast.

8. The opposed-piston disc brake according to claim 1, wherein the inner caliper portion, the outer caliper portion and the bridge portions are integrally cast.

9. An opposed-piston disc brake comprising:

a caliper body including an inner caliper portion and an outer caliper portion facing the inner caliper portion, the inner caliper portion and the outer caliper portion being connected to each other via bridge portions extending over a disc rotor;

pistons inserted into corresponding cylinders provided at the inner caliper portion and the outer caliper portion, the pistons being hydraulically operated;

brake pads arranged to face each other and being thrust by the pistons to slidably contact the disc rotor;

cylinder connection oil passages respectively connected to the cylinder of the inner caliper portion and the cylinder of the outer caliper portion;

passage communication bores respectively formed at the bridge portions to extend in an axial direction of a disc in a substantially straight manner; and an air bleeder screwed into a bleeder hole to fill the bleeder hole, the bleeder hole formed to be connected to an inner end portion of one of passage communication bores, wherein the cylinder connection oil passages are formed using a core at the time when the caliper body is cast, the cylinder connection oil passages extend from bottom portions of the cylinders to the passage communication bores in a radially outer direction of the disc, ends of the cylinder connection oil passages in a longitudinal direction thereof are directly connected to the passage communication bores, in a state where the caliper body is mounted on a vehicle, a top portion of an inner wall surface of one of the passage communication bores, formed at the bridge portion formed at an upper side of the caliper body, is positioned higher than the ends of the cylinder connection oil passages, and each of the passage communication bores is formed so as to have a circular-shaped cross section and a radius of the ends of each of the cylinder connection oil passages is set to be larger than a radius of each of the passage communication bores, when seen in a cross-sectional view taken along a line orthogonal relative to the axial direction of the disc.

10. The opposed-piston disc brake according to claim 9, wherein the bleeder hole is arranged coaxially with one of the passage communication bore.

11. The opposed-piston disc brake according to claim 10, wherein the inner caliper portion, the outer caliper portion and the bridge portions are integrally cast.

12. The opposed-piston disc brake according to claim 9, wherein the inner caliper portion, the outer caliper portion and the bridge portions are integrally cast.

* * * * *